United States Patent
Putcha

(10) Patent No.: US 7,801,527 B2
(45) Date of Patent: Sep. 21, 2010

(54) CELL UPDATE PROCESS WITH RECONFIGURATION STATUS

(75) Inventor: Padmaja Putcha, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 539 days.

(21) Appl. No.: 11/117,047

(22) Filed: Apr. 28, 2005

(65) Prior Publication Data

US 2006/0246883 A1    Nov. 2, 2006

(51) Int. Cl.
*H04W 4/00*    (2009.01)
*H04W 24/00*    (2009.01)

(52) U.S. Cl. .................. 455/435.1; 455/425

(58) Field of Classification Search .......... 455/419, 455/435.1, 412.1, 412.2, 423, 424, 425
See application file for complete search history.

(56) References Cited

U.S. PATENT DOCUMENTS

| | | | |
|---|---|---|---|
| 6,961,570 B2 * | 11/2005 | Kuo et al. | 455/436 |
| 6,996,092 B1 * | 2/2006 | Maguire et al. | 370/356 |
| 7,076,248 B2 * | 7/2006 | Amirijoo et al. | 455/432.1 |
| 7,194,277 B2 * | 3/2007 | Farnsworth | 455/458 |
| 2004/0224686 A1 * | 11/2004 | Pedlar | 455/435.1 |
| 2004/0224688 A1 * | 11/2004 | Fischer | 455/435.1 |
| 2005/0054298 A1 * | 3/2005 | Chen | 455/67.11 |
| 2005/0068919 A1 * | 3/2005 | Pedlar et al. | 370/329 |
| 2005/0070274 A1 * | 3/2005 | Pedlar et al. | 455/432.1 |
| 2005/0175034 A1 * | 8/2005 | De Jong et al. | 370/473 |
| 2005/0176437 A1 * | 8/2005 | Mir | 455/450 |
| 2006/0035645 A1 * | 2/2006 | Kim | 455/452.1 |
| 2006/0142020 A1 * | 6/2006 | Mueckenheim et al. | 455/453 |

FOREIGN PATENT DOCUMENTS

EP    1408658 A2    4/2004

OTHER PUBLICATIONS

3rd Generation Partnership Project; "3GPP TS 25.331 V6.5.0 (Mar. 2005)"; Technical Specification Group Radio Access Network; Radio Resource Control (RRC); Protocol Specification (Release 6) Mar. 2005; pp. 1-27, 116-133, 152-173, and 376-377.
3GPP; "Cell Update During Reconfiguration Procedure"; XP-002387425, Apr. 4-8, 2005; 21 pages.
3GPP; "Cell Update During Reconfiguration"; XP-002278706; Oct. 6-10, 2003; 7 pages.
3rd Generation Partnership Project; "3GPP TS 25.331 V6.5.0 (Mar. 2005)"; Technical Specification Group Radio Access Network; Radio Resource Control (RRC); Protocol Specification (Release 6), Mar. 2005, pp. 38-39 and 994.

* cited by examiner

*Primary Examiner*—George Eng
*Assistant Examiner*—Christopher M Brandt
(74) *Attorney, Agent, or Firm*—Sylvia Chen

(57) ABSTRACT

If there is a radio link failure condition (330) between a user equipment (380) and a network (390) during or after a reconfiguration process, a cell update process with reconfiguration status indicates whether a user equipment reconfiguration is complete. If the network (390) receives an indication that the user equipment reconfiguration is complete, either through a stand-alone reconfiguration complete message (320) or a status indicator of a cell update message (350) from the user equipment (380), the network (390) proceeds in accordance with the current configuration.

9 Claims, 5 Drawing Sheets

CELL UPDATE PROCESS WITH RECONFIGURATION STATUS

FIELD OF THE DISCLOSURE

This disclosure relates generally to radiotelephone communications and setup of radio access links in particular.

BACKGROUND OF THE DISCLOSURE

According to 3GPP Technical Specification 25.331, when a user initiates a call on user equipment (UE) such as a radiotelephone, laptop with wireless connection, or wireless messaging device, an RRC Connection Request message is sent by the UE to the network to trigger the establishment of a radio resource control connection. The network then assigns radio resources to the UE and sends an RRC Connection Setup message to direct the UE to properly configure its signaling radio bearers. After the UE has configured its radio resource control connection, the UE sends an RRC Connection Setup Complete message to the network.

After the network receives the message that the radio resource control connection is properly configured, the network sends a Radio Bearer Setup message to direct the UE to properly configure its user radio bearers. Once the user radio bearers are properly configured, the UE sends a Radio Bearer Setup Complete message to the network. Because this message is sent in Acknowledgement Radio Link Control (RLC) mode, the network sends an RLC protocol layer ACK to the UE upon reception of the Radio Bearer Setup Complete message.

If a radio link failure, such as a signal fade or excessive signal noise, occurs during or after the RRC layer in the UE submits a Radio Bearer Setup Complete message to its lower layers for transmission to the network, the network will not receive the Radio Bearer Setup Complete message and the network will not send an RLC layer ACK. Upon radio link failure, the UE will send a Cell Update message with a cause of "radio link failure." Because the network did not receive a Radio Bearer Setup Complete message from the UE, the network will assume that the UE failed to properly configure its radio bearers in accordance with the earlier Radio Bearer Setup message from the network. This could lead to the network and the UE getting out of sync with respect to the configurations used at their respective ends—eventually leading to a call drop.

If a radio link failure, such as a signal fade or excessive signal noise, occurs after the network has received the Radio Bearer Setup Complete message, the UE will also send a Cell Update message with a cause of "radio link failure." In this situation, the network will assume that the UE configured its user radio bearers in accordance with the earlier Radio Bearer Setup message from the network, the network and the UE will be in sync, and the call will continue.

Thus, depending on the exact timing of a radio link failure following a UE configuring its radio bearers, a call could drop or continue. There is an opportunity for the UE and the network to maintain a call more consistently after a radio link failure during or shortly after configuration of a UE's radio bearers. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

With the increase in availability and usage of multiple simultaneous services, it is increasingly expected for a network to send a reconfiguration message to User Equipment (UE) to accommodate the configuration needed for the additional service. A reconfiguration message could be a radio bearer setup message, a radio bearer reconfiguration message, a transport channel reconfiguration message, or another type of message where the network requests that the UE reconfigure (or configure) its radio bearers. A reconfiguration message can be used to switch among voice-only, rich voice, voice-plus-data, and other transport formats. Unfortunately, it is fairly common for a UE to experience radio link failures after receiving a reconfiguration message from the network. If such a radio link failure occurs, then the UE and the network may be out of synchronization. In other words, under certain circumstances the network is assuming that the UE is using one configuration and the UE is actually using a different configuration.

If there is a radio link failure between a UE and a network during or after a reconfiguration process, a cell update process with reconfiguration status indicates whether a user equipment reconfiguration is complete. In a first embodiment, if the network receives an indication that the user equipment reconfiguration is complete, either through a stand-alone reconfiguration complete message or a status indicator of a cell update message from the user equipment, the network proceeds in accordance with the current configuration. In a second embodiment, if at the time of receiving a cell update message with cause "radio link failure" from a UE, the network determines that the user equipment reconfiguration is not complete, then the network sends a cell update confirm message indicating that no reconfiguration complete message was received and reverts to the previous configuration. Upon receipt of the cell update confirm message indicating that no reconfiguration complete message was received, the user equipment also reverts to the previous configuration.

Figure 1:
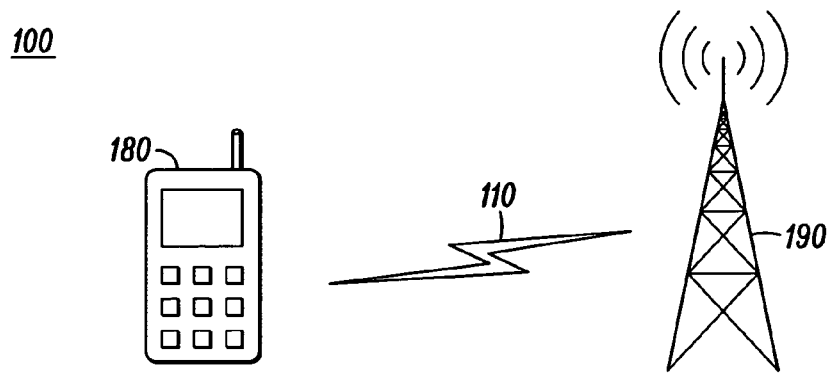
FIG. 1 shows a simplified 3GPP system radio access network with user equipment and a network according an embodiment.

FIG. 1 shows a simplified 3GPP system 100 radio access network with user equipment 180 and a network 190 according an embodiment. In the embodiments discussed below, a Third Generation Partnership Project (3GPP) wireless communication system is shown; however, the principles disclosed may be applied to other types of wireless communication systems including future versions of the 3GPP system. A radio access network 100 enables a wireless communication link 110 between a User Equipment (UE) 180 antenna and an antenna of a network 190. A UE 180 can be a radio-telephone, laptop with wireless connection, wireless messaging device, or other type of compatible wireless communication device. The wireless communication link 110 is variable, and wireless communication link failures can be caused by, for example, signal blockage, signal fading, or signal noise affected by location of the UE 180 relative to the network 190 antenna, movement of the UE 180, proximity of the UE 180 to other wireless devices, and other factors.

Figure 2:
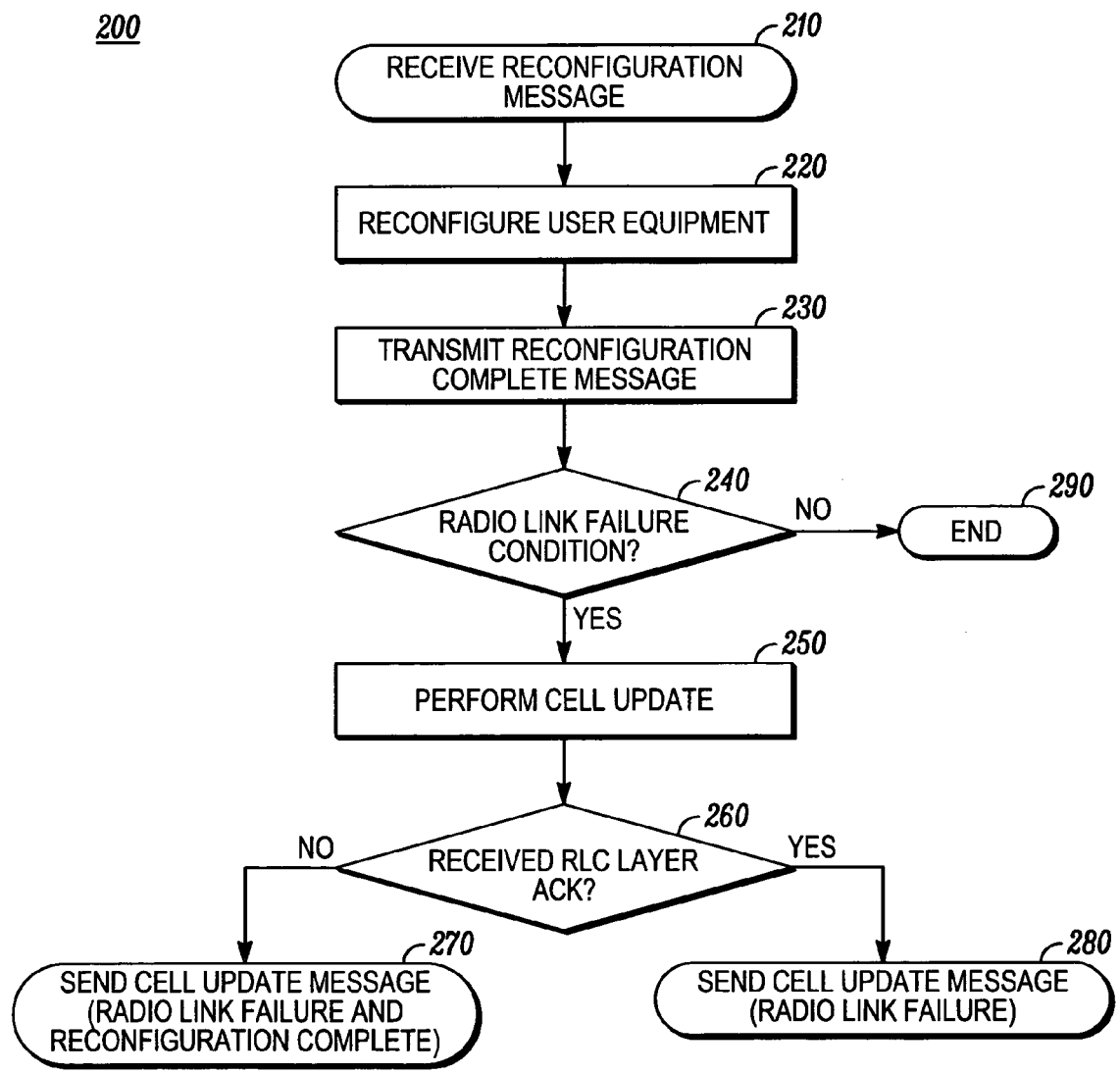
FIG. 2 shows a flowchart of a cell update with reconfiguration status for the user equipment shown in FIG. 1 according to a first embodiment.

FIG. 2 shows a flowchart 200 of a cell update with reconfiguration status for the user equipment 180 shown in FIG. 1 according to a first embodiment. In step 210, the UE 180 receives a reconfiguration message from a network such as network 190 shown in FIG. 1. The reconfiguration message could be a radio bearer setup message, a radio bearer reconfiguration message, a transport channel reconfiguration message, or another type of message where the network requests that the UE reconfigure (or configure) its radio bearers. In step 220, the UE reconfigures its user equipment in accordance with the reconfiguration message. In step 230, the UE transmits a reconfiguration complete message to the network. If step 240 determines a radio link failure condition occurred after the UE received the reconfiguration message in step 210, the UE performs a cell update in step 250. Step 260 determines if an RLC layer ACK has been received. An RLC layer ACK is a simple Layer 2 acknowledgement message from the network indicating that the reconfiguration complete message from step 230 has been received by the network.

If an RLC layer ACK has not been received at the time of radio link failure, the UE sends a cell update message with a status indicator of "radio link failure" and "reconfiguration complete" in step 270. This dual status indicator can be implemented as an additional Boolean status indicator specifically for "reconfiguration complete" (TRUE or FALSE) or as an extension to existing cause values indicating the reason for the cell update performed in step 250.

If an RLC layer ACK has been received, the UE sends a cell update message with a status indicator of "radio link failure" in step 280. Also, if no radio link failure condition is determined by step 240 then the process ends in step 290 without a cell update.

By following this flowchart 200, a network 190 is consistently informed of the status of the radio bearers in a UE 180—regardless of specifically when a radio link failure occurs after a UE receives a reconfiguration message. If a radio link failure occurs after the network 190 receives the reconfiguration complete message, then the network 190 is already aware of the UE 180 configuration. If a radio link failure occurs before the network 190 can receive the reconfiguration complete message, then the cell update message with a status indicator of "radio link failure" and "reconfiguration complete" informs the network 190 that the UE 180 is properly configured and that the network 190 should use the most recently sent radio bearer configuration instead of, for example, reverting to a previous configuration.

Figure 3:
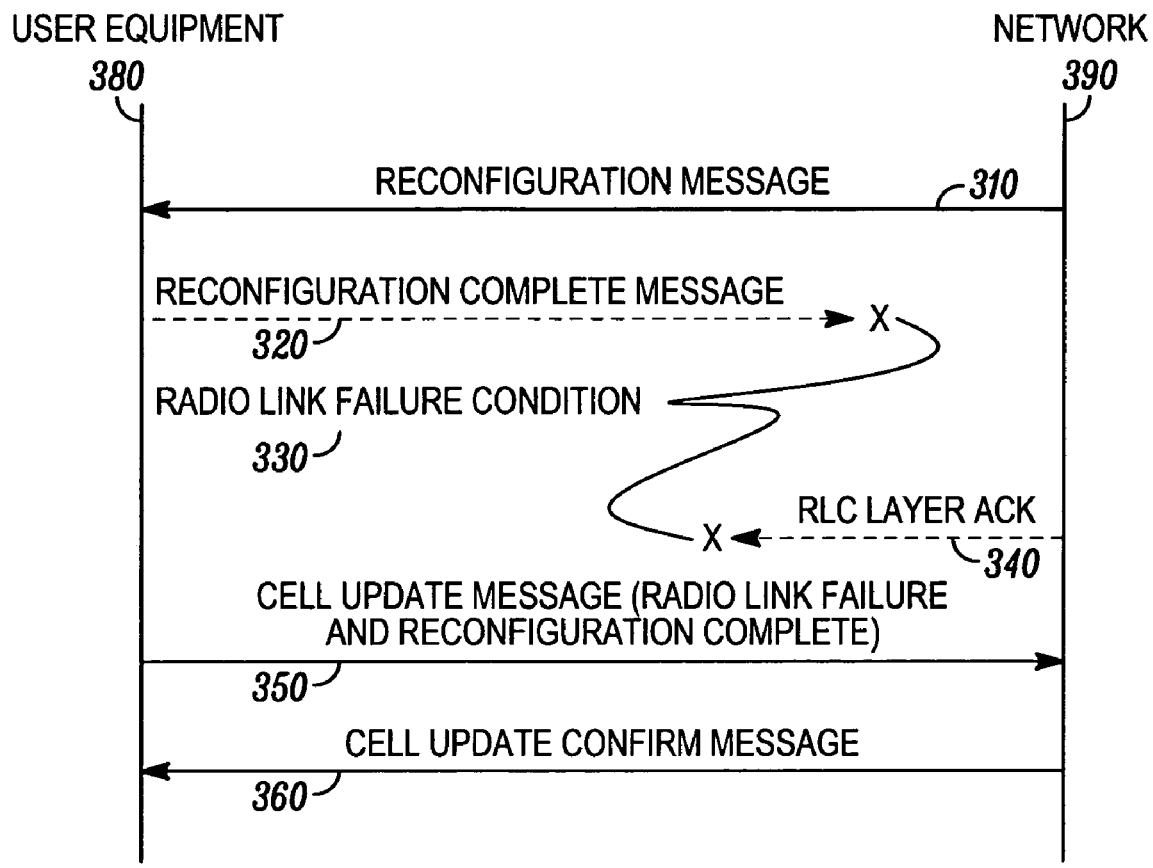
FIG. 3 shows a basic example signal flow diagram for a cell update with reconfiguration status for the 3GPP system shown in FIG. 1 according to the first embodiment.

FIG. 3 shows a basic example signal flow diagram 300 for a cell update with reconfiguration status for the 3GPP system 100 shown in FIG. 1 according to the first embodiment. The User Equipment (UE) 380 corresponds to the UE 180 shown in FIG. 1 and implements the flowchart 200 shown in FIG. 2. The network 390 corresponds to the network 190 shown in FIG. 1.

The network 390 sends a reconfiguration message 310 to the UE 380. The reconfiguration message could be a radio bearer setup message, a radio bearer reconfiguration message, a transport channel reconfiguration message, or another type of message where the network requests that the UE reconfigure (or configure) its radio bearers. The UE 380 reconfigures its user equipment in accordance with the reconfiguration message 310 and transmits a reconfiguration complete message 320 to the network 390. If the network 390 successfully receives the reconfiguration complete message 320, it sends an RLC layer ACK 340 to the UE 380.

If a radio link failure condition 330 occurred after the UE 380 received the reconfiguration message 310, the network 390 will not receive the reconfiguration complete message 320 and subsequently the network 390 will not transmit an RLC layer ACK 340 to the UE 380. If a radio link failure condition 330 occurred after the network 390 received the reconfiguration complete message 320, the UE 380 will not receive the RLC layer ACK 340.

Without regard to specifically when the radio link failure condition 330 occurred, the UE 380 will perform a cell update and transmit a cell update message 350 with a status indicator of "radio link failure" and "reconfiguration complete." As stated earlier, the dual status indicator can be implemented as an additional Boolean status indicator specifically for "reconfiguration complete" (TRUE or FALSE) or as an extension to existing cause values indicating the reason for the cell update. Upon receipt of the cell update message 350, the network 390 responds with a cell update confirm message 360.

Thus, under either circumstance—whether the radio link failure condition 330 causes unavailability of the reconfiguration complete message 320 at the network 390 or whether the radio link failure condition 330 causes unavailability of the RLC layer ACK 340 at the UE 380—the "reconfiguration complete" aspect of the cell update message 350 informs the network 390 that the UE 380 is properly configured according to the most recent reconfiguration message 310 sent by the network 390.

Figure 4:
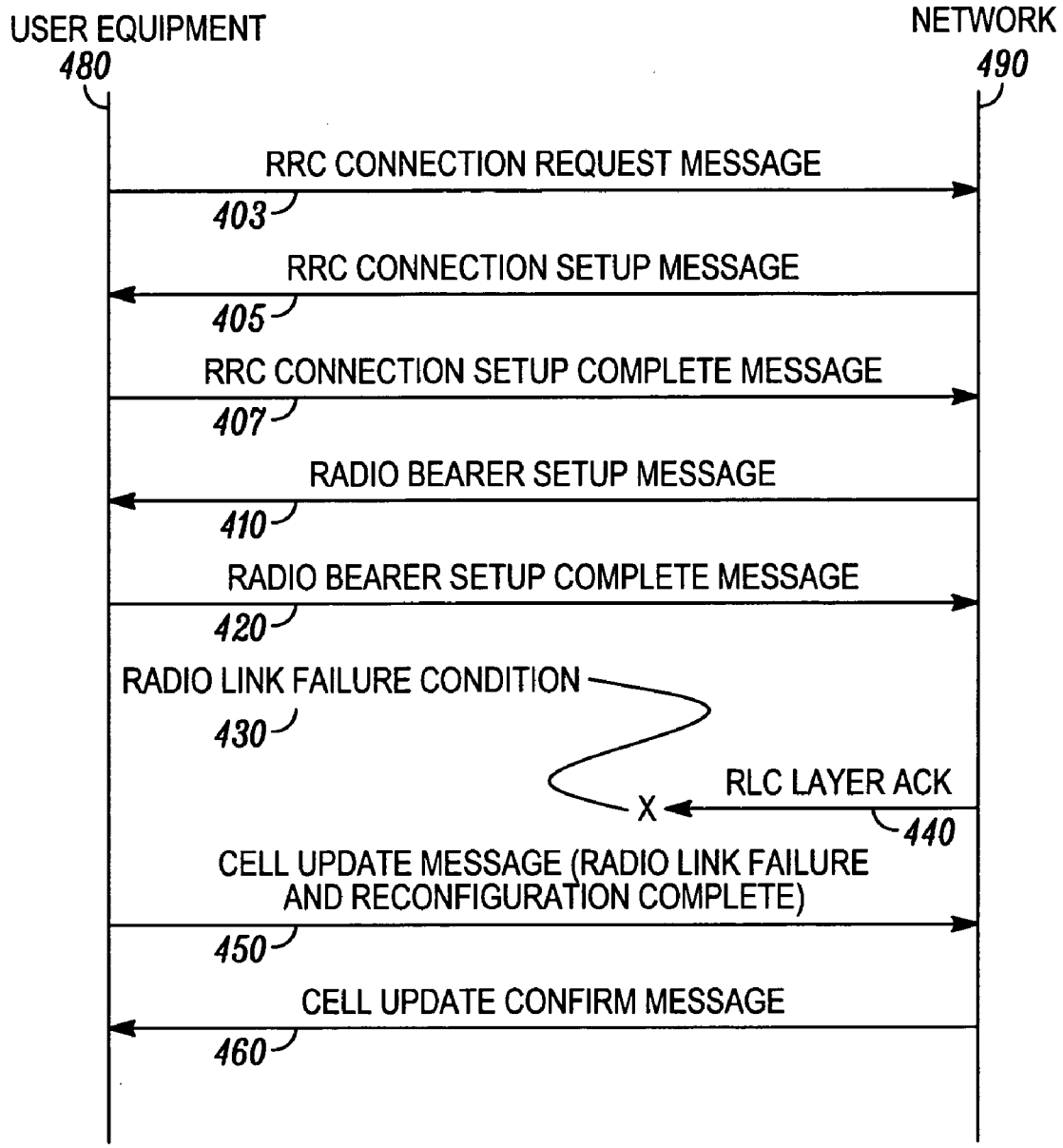
FIG. 4 shows a first advanced example signal flow diagram for a cell update with reconfiguration status for the 3GPP system shown in FIG. 1 according to the first embodiment.

FIG. 4 shows a first advanced example signal flow diagram 400 for a cell update with reconfiguration status for the 3GPP system 100 shown in FIG. 1 according to the first embodiment. This first advanced example signal flow diagram 400 includes radio resource connection (RRC) setup message flows, which are not shown in the flowchart 200 of FIG. 2.

When user equipment (UE) 480 initiates a call, the UE 480 sends an RRC connection request message 403 to a network 490. The network 490 sends an RRC connection setup message 405 directing the UE 480 to configure its signaling radio bearers in accordance with the RRC connection setup message 405. After the UE 480 configures its radio resource control connection, the UE 480 sends an RRC connection setup complete message 407 to the network 490.

At this point, the network 490 sends a radio bearer setup message 410 directing the UE 480 to configure its user radio bearers in accordance with the radio bearer setup message 410. A radio bearer setup message 410 is a type of reconfiguration message in accordance with reconfiguration message 310 in FIG. 3 and step 210 in FIG. 2. The UE 480 configures user radio bearers according to the radio bearer setup message 410 and sends a radio bearer setup complete message 420 to the network 490. The network 490 responds with an RLC layer ACK 440. In this first advanced example, a radio link failure condition 430 occurred after the radio bearer setup complete message 420 was received by the network 490 and therefore the RLC layer ACK 440 is not received by the user equipment 480.

Because of the radio link failure condition, the UE 480 sends a cell update message 450 with status indicator "radio link failure" and "reconfiguration complete." The network 490 responds with a cell update confirm message 460. The "reconfiguration complete" aspect of the cell update message 450 is redundant in this situation because the network 490 is already aware that the reconfiguration is complete through its receipt of the radio bearer setup complete message 420. The UE 480, however, has no way of knowing that the network 490 successfully received the radio bearer setup complete message 420 because the UE 480 did not receive the RLC layer ACK 440. Thus, sending the cell update message 450 with status indicator "radio link failure" and "reconfiguration complete" provides assurance that the UE 480 and the network 490 will not be out of sync and the call will be maintained.

Figure 5:
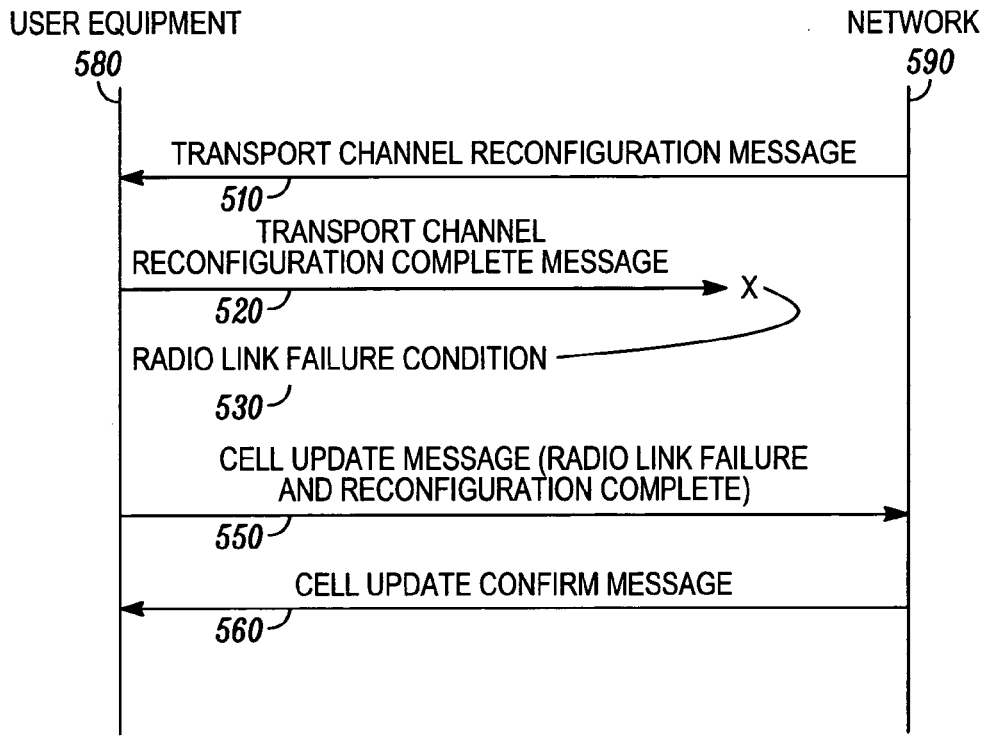
FIG. 5 shows a second advanced example signal flow diagram for a cell update with reconfiguration status for the 3GPP system shown in FIG. 1 according to the first embodiment.

FIG. 5 shows a second advanced example signal flow diagram 500 for a cell update with reconfiguration status for the 3GPP system 100 shown in FIG. 1 according to the first embodiment. The second advanced example signal flow diagram 500 could occur after the first advanced example signal flow diagram 400 is completed. In this situation, User Equipment (UE) 580 radio bearers have been set up through the RRC connection process and the radio bearer setup process shown in FIG. 4.

At this point, the network 590 sends a transport channel reconfiguration message 510 to the UE 580. A transport channel reconfiguration message 510 is a type of reconfiguration message in accordance with reconfiguration message 310 in FIG. 3 and step 210 in FIG. 2. A transport channel reconfiguration message 510 is appropriate when, for example, the system is increasing (or decreasing) data rates due to availability (or unavailability) of network resources. The UE 580 reconfigures in accordance with the transport channel reconfiguration message 510 and transmits a transport channel reconfiguration complete message 520. In this second advanced example, a radio link failure condition 530 occurred after the transport channel reconfiguration message 510 was received by the UE 580 and therefore the transport channel reconfiguration complete message 520 is not received by the network 590.

Because of the radio link failure condition 530, the UE 580 sends a cell update message 550 with status indicator "radio link failure" and "reconfiguration complete." The network 590 responds with a cell update confirm message 560. In this situation, the "reconfiguration complete" aspect of the cell update message 550 is vital, because the network 590 never received the transport channel reconfiguration complete message 520 and thus would incorrectly assume that the UE 580 had not been properly reconfigured. Thus, sending the cell update message 550 with status indicator "radio link failure" and "reconfiguration complete" provides assurance that the UE 580 and the network 590 will not be out of sync and the call will be maintained.

Figure 6:
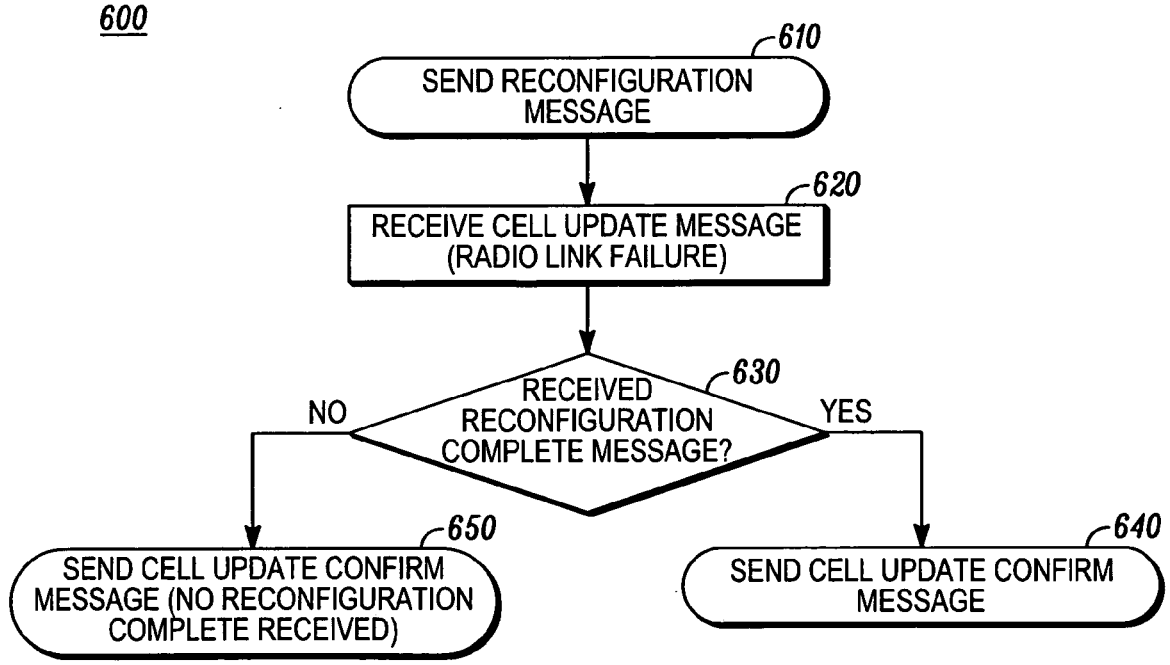
FIG. 6 shows a flowchart of a cell update with reconfiguration status for the network shown in FIG. 1 according to a second embodiment.

FIG. 6 shows a flowchart 600 of a cell update with reconfiguration status for the network 190 shown in FIG. 1 according to a second embodiment. In step 610, the network 190 sends a reconfiguration message to User Equipment (UE) such as UE 180 shown in FIG. 1. The reconfiguration message could be a radio bearer setup message, a radio bearer reconfiguration message, a transport channel reconfiguration message, or another type of message where the network requests that the UE reconfigure (or configure) its radio bearers. In step 620, the network 190 receives a cell update message with a status indicator of "radio link failure." Step 630 determines if a reconfiguration complete message has been received. If a reconfiguration complete message has been received, the network 190 responds by sending a cell update confirm message in step 640. If no reconfiguration complete message has been received, the network 190 responds by sending a cell update confirm message in step 650 with a status indicator of "no reconfiguration complete received." Note that a cell update confirm message without a status indicator of "no reconfiguration complete received" implies that a reconfiguration complete message has been received by the network.

In situations where a cell update confirm message with a status indicator of "no reconfiguration complete received" is sent, the network 190 reverts to the most recent configuration where a reconfiguration complete message was received. The cell update confirm message with a status indicator of "no reconfiguration complete received" alerts the UE that no reconfiguration complete message was received by the network, and the UE reverts to the most recent configuration where a reconfiguration complete message was acknowledged. Thus, the UE and the network both revert to the previous configuration in order to maintain sync and avoid dropping the call.

Figure 7:
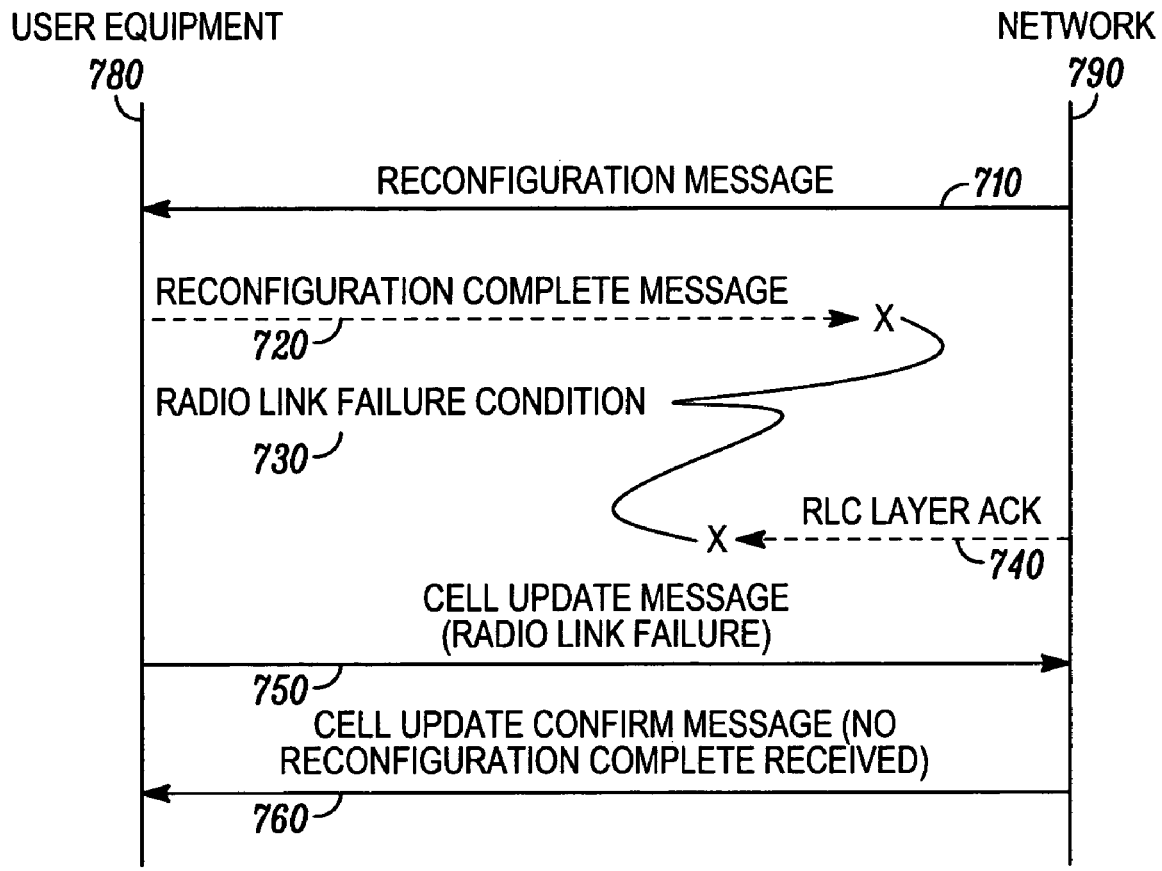
FIG. 7 shows a basic example signal flow diagram for a cell update with reconfiguration status for the 3GPP system shown in FIG. 1 according to the second embodiment.

FIG. 7 shows a basic example signal flow diagram 700 for a cell update with reconfiguration status for the 3GPP system 100 shown in FIG. 1 according to the second embodiment. The network 790 corresponds to the network 190 shown in FIG. 1 and performs the flowchart 600 shown in FIG. 6. The UE 780 corresponds to the UE 180 shown in FIG. 1.

The network 790 sends a reconfiguration message 710 to the UE 780. The reconfiguration message could be a radio bearer setup message, a radio bearer reconfiguration message, a transport channel reconfiguration message, or another type of message where the network requests that the UE reconfigure (or configure) its radio bearers. The UE 780 reconfigures its user equipment in accordance with the reconfiguration message 710 and sends a reconfiguration complete message 720 to the network 790. If the network 790 successfully receives the reconfiguration complete message 720, it sends an RLC layer ACK 740 to the UE 780.

If a radio link failure condition 730 occurred after the UE 780 received the reconfiguration message 710, the network 790 will not receive the reconfiguration complete message 720 and subsequently the network 790 will not transmit an RLC layer ACK 740 to the UE 780. If a radio link failure condition 730 occurred after the network 790 received the reconfiguration complete message 720, the UE 780 will not receive the transmitted RLC layer ACK 740.

Without regard to specifically when the radio link failure condition 730 occurred, the UE 780 will perform a cell update and transmit a cell update message 750 with a cause of "radio link failure." If the network has not received the reconfiguration complete message 720 when a cell update message 750 with a cause of "radio link failure" is received from the UE, the network 790 responds with a cell update confirm message 760 with a status indicator of "no reconfiguration complete received."

Thus, under either circumstance—whether the radio link failure condition 730 causes unavailability of the reconfiguration complete message 720 at the network 790 or whether the radio link failure condition 730 causes unavailability of the RLC layer ACK 740 at the UE 780—the "no reconfiguration complete received" aspect of the cell update confirm message 760 informs the UE 780 that the network 790 is operating as if the latest reconfiguration message 710 was not acted upon by the UE 780. In this situation, the UE 780 would revert to the previous configuration and thus maintain sync with the network 790 and avoid dropping the call.

Thus, the cell update process with reconfiguration status allows a UE and a network to maintain sync even when a wireless link failure occurs during a reconfiguration process. In a first embodiment, a UE sends a cell update message with an aspect that indicates whether a UE reconfiguration is complete. In a second embodiment, a network sends a cell update confirm message with an aspect that indicates whether a UE reconfiguration complete message has been received. Both embodiments allow the UE and network to notify each other whether the most recent reconfiguration message has been implemented by the UE and network respectively. With this information, the UE and network can maintain sync and avoid dropping calls due to wireless link failures during a reconfiguration process.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, and the like, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

I claim:

1. A cell update process for user equipment comprising:
reconfiguring the user equipment in accordance with a reconfiguration message from a network;
transmitting a reconfiguration complete message;
experiencing a radio link failure condition;
performing a cell update;
determining if an acknowledgement to the reconfiguration complete message has been received from the network; and
based on the determining, sending to the network a cell update message indicating a radio link failure and that an acknowledgement to the reconfiguration complete message has not been received.

2. A cell update process according to claim 1 wherein the reconfiguration message is a radio bearer setup message.

3. A cell update process according to claim 1 wherein the reconfiguration message is a radio bearer reconfiguration message.

4. A cell update process according to claim 1 wherein the reconfiguration message is a transport channel reconfiguration message.

5. A cell update process according to claim 1 further comprising:
sending to the network a call update message indicating a radio link failure, if an acknowledgement to the reconfiguration complete message has been received.

6. A cell update process for a network comprising:
sending to user equipment a reconfiguration message;
receiving from the user equipment a cell update message indicating a radio link failure;
determining if a reconfiguration complete message has been received from the user equipment; and
based on the determining, sending to the user equipment a cell update confirm message indicating that a reconfiguration complete message has not been received.

7. A cell update process according to claim 6 wherein the reconfiguration complete message is a radio bearer setup complete message.

8. A cell update process according to claim 6 wherein the reconfiguration complete message is a radio bearer reconfiguration complete message.

9. A cell update process according to claim 6 wherein the reconfiguration complete message is a transport channel reconfiguration complete message.

* * * * *